United States Patent
Bode et al.

(10) Patent No.: US 7,341,762 B2
(45) Date of Patent: Mar. 11, 2008

(54) COATING COMPOSITION HAVING IMPROVED RELEASE PROPERTIES AND THE PROCESS FOR MAKING THE SAME

(75) Inventors: Daniel Bode, Cleveland, OH (US); Timothy I. Memmer, Strongsville, OH (US); Deborah L. Howard, Kingsbury Nr. Tamworth (GB)

(73) Assignee: The Glidden Company, Strongsville, OH (US)

( * ) Notice: Subject to any disclaimer, the term of this patent is extended or adjusted under 35 U.S.C. 154(b) by 0 days.

(21) Appl. No.: 10/338,520

(22) Filed: Jan. 8, 2003

(65) Prior Publication Data
US 2004/0131784 A1 Jul. 8, 2004

(51) Int. Cl.
*B05D 7/14* (2006.01)
(52) U.S. Cl. ...................... 427/410; 427/386
(58) Field of Classification Search ............. 427/372.2, 427/410, 386; 523/402, 403, 406, 423, 440, 523/463, 465
See application file for complete search history.

(56) References Cited

U.S. PATENT DOCUMENTS

| | | | |
|---|---|---|---|
| 4,212,781 A | * | 7/1980 | Evans et al. ............. 523/403 |
| 4,556,498 A | * | 12/1985 | Carbo et al. ............. 508/223 |
| 4,604,325 A | * | 8/1986 | Pollet et al. ............. 428/391 |
| 5,318,808 A | * | 6/1994 | Crivello et al. ............. 427/517 |
| 6,306,934 B1 | | 10/2001 | Bode et al. |

FOREIGN PATENT DOCUMENTS

| | | |
|---|---|---|
| EP | 0 428 316 A | 5/1991 |
| GB | 2 097 802 | 11/1982 |
| JP | 06 016774 A | 1/1994 |
| JP | 06 016904 A | 1/1994 |
| JP | 06 293864 A | 10/1994 |
| WO | WO 01/59018 | 8/2001 |

OTHER PUBLICATIONS

RN 63231-60-7, Chemical Abstracts on-line service 2004.*
Machine Translation of JP 06-016774, obtained from JPO website, Jan. 1994.*
Machine Translation of JP 06-016904, obtained from JPO website, Jan. 1994.*
Mark, Encyclopedia of Polymer Science and Engineering, vol. 7, Wiley-Interscience, 1987, pp. 551-579.*

* cited by examiner

*Primary Examiner*—Kuo-Liang Peng
(74) *Attorney, Agent, or Firm*—Benesch, Friedlander, Coplan & Arnoff, LLP

(57) ABSTRACT

A protective coating composition and a method for coating a metal substrate are provided. The composition and method are particularly suitable for coating can ends. The coating composition includes a film-forming polymer that includes an epoxy-based resin, a lubricant system, and a solvent or water component or mixture of solvent and water. The lubricant system includes a first surface modifier that reduces the coefficient of friction and a second surface modifier that reduces the abrasion of the cured coating.

24 Claims, No Drawings

COATING COMPOSITION HAVING IMPROVED RELEASE PROPERTIES AND THE PROCESS FOR MAKING THE SAME

FIELD

This invention relates to a coating composition, particularly useful as can coatings for beverage and food containers and the process for making the coating compositions. Invention also relates to a process for making can ends using the coating composition.

BACKGROUND

Coating compositions for metal containers require physical properties that withstand the processing conditions in manufacturing the metal containers. Lids for metal containers, for example, are typically manufactured by first coating flat sheets of a metal substrate, heating the coated substrate and then stamping or shaping the coated substrate into a container having a desired shape.

Coating compositions generally contain a film-forming synthetic resin component which is applied to metal sheet substrate in the form of dispersion and is then heat-cured to a dried film. The coatings applied to food and beverage can ends, for example, are applied in film weights of approximately 1 milligram per square inch to approximately 9 milligrams per square inch on high speed coil coating lines. High speed coating lines require a coating material that will dry and cure within a few seconds as it is heated very rapidly to peak metal temperatures that can range from approximately 200° C. to approximately 300° C. (392° F. to about 550° F.).

Polyvinylchloride (PVC)-based coatings have been used to coat the interior and exterior of metal containers for foods and beverages because these coatings exhibit an acceptable combination of adhesion to a metal substrate, flexibility, chemical resistance, and corrosion inhibition. These PVC containing coatings, however, are being replaced by solvent and water-borne epoxy systems in order to eliminate excessive levels of bisphenol A diglycidyl ether, a stabilizer used in PVC coatings, and to eliminate the potential of dioxin production if the PVC coating is improperly burned. Concerned industrial applicators are acting to eliminate these polyvinylchloride-based coating compositions to eliminate the environmental and health concerns associated with them.

Due to these concerns and the environmental concerns associated with organic solvents, there is an increasing demand for aqueous coating compositions. Water-borne epoxy systems have been used to coat the outside of easy open ends of beverage cans, for example, but their use has caused problems in productivity and quality on certain tooling designs.

More specifically, repeated stamping of a coil that is coated with alternative coating compositions, i.e. those which do not contain PVC, can result in build up of the coating on the forming tool as well as a scuffed coating on the can ends. When coated metal coil is fed into a forming press, the coating is contacted by the tool under pressure as the tool forms the shape of the can end, and then the tool is separated from the surface of the coated metal. The repeated contact of the tool with the coating during shaping produces a gradual build-up of the coating on the tool. Also, the coating along the perimeter of the can end is scuffed as the formed can ends are separated from the tool. This scuffing problem not only results in can ends having thickened edges, but also results in the need for high maintenance efforts surrounding the forming press and, in some cases, results in complete shutdown of a production line.

SUMMARY

The present invention provides for a coating composition which demonstrates improved release properties during fabrication of the coated substrate. The coating composition herein eliminates the toxicological issues associated with the use of PVC coatings and can also minimize the environmental problems associated with the use of organic solvents. The coating composition of the present invention also provides excellent adhesion, flexibility and chemical resistance necessary for a high quality metal container.

In one embodiment of the invention, the coating composition includes a film-forming resin component, a lubricant system and a solvent. The film-forming resin component includes an epoxy resin-based polymer. The lubricant system includes at least two or more surface modifiers. The lubricant system includes a first surface modifier that reduces the coefficient of friction of the coating composition relative to a coating system containing an epoxy-based resin and that does not contain the first surface modifier. The lubricant system also contains a second surface modifier that is different from the first surface modifier and that increases the abrasion resistance of the coating composition relative to a coating composition containing an epoxy-based resin and that does not contain the second surface modifier. The solvent can include an organic material, water, or a mixture of an organic material and water.

In one embodiment of the invention, the coating composition includes an epoxy-acrylic resin, a lubricant system and a solvent that includes both water and organic material. In another embodiment of the invention, the coating composition includes an epoxy-polyester resin, a lubricant system and a solvent that is an organic material. In these embodiments, the coating composition contains from about 0.2% by weight to about 20% by weight lubricant solids, preferably from about 0.5% to about 7%, based on the total weight of solids in the coating composition, and at least about 0.25% by weight of the first surface modifier and at least 0.25% by weight of the second surface modifier.

The present invention also provides a method of coating a metal substrate to provide a cured film on at least one surface of the substrate. The method includes applying the coating composition onto the surface of the metal substrate to form a coating layer. The coated metal substrate is then heated so that the coating layer cures to form a cured film adhered to the substrate surface. The coating metal substrate is typically cured by heating for about 5 to about 25 seconds in an oven to achieve a peak metal temperature of about 200° C. to about 250° C. The cured film typically has a film weight of at least about 1 mg/in² and, preferably, from about 1 mg/in² to about 8 mg/in².

The present invention also provides a composite material which includes a metal substrate having at least one surface covered with a cured film, which is the result of coating the substrate surface with the above-described coating composition and heating the coated metal substrate for a period of from about 5 to about 25 seconds to achieve a peak metal temperature of 200° C. to 250° C. The cured film preferably has a film weight of at least about 1 mg/in², and preferably from about 1 mg/in² to about 8 mg/in².

DETAILED DESCRIPTION

The coating composition of the present invention includes a film-forming epoxy-based resin component, a lubricant system and a solvent. It has been found that when a film-forming component that is an epoxy-based resin is combined with a lubricant system having a first surface modifier that reduces the coefficient of friction and a second surface modifier that increases the resistance to abrasion, the coating has excellent release properties after curing. Whereas epoxy-based coating systems have caused problems during formation and release of coated metal substrate in some applications, the present coating composition has been found to improve the quality of the formed substrate and to increase productivity.

Coating Composition

The coating composition of the present invention contains total solids present in a weight that ranges from about 10% to about 50%, preferably from about 25% to about 45%, and more preferably from about 25% to about 40%, and the remainder is solvent. The solvent can include water, an organic solvent, or a co-solvent of two or more solvents, such as, for example, water and organic solvent. A coating composition having from about 25% to about 35% by weight solids allows application of a dried film weight of about 1-3 milligrams per square inch, and a coating composition having from about 30% to about 40% by weight solids allows application of a dried film weight of about 6-8 milligrams per square inch.

The amount of solvent in the coating composition varies, however, there is at least about 50% by weight solvent, based on the liquid coating composition. If water is present, the amount of water in the coating composition ranges from about 20% to about 50%, and is preferably from about 30% to about 45%, and the amount of solvent ranges from about 20% to about 45%, and preferably, from about 25% to about 40% solvent.

The coating composition includes a film-forming component that is an epoxy-based resin. The coating composition includes, by weight, based on the weight of total solids, from about 5% to about 99.8%, preferably from about 25% to about 99.8%, more preferably from about 50% to about 99.5%, and even more preferably, from about 53% to about 99.5% epoxy-based resin.

The fully cured and dried coating composition also includes, by weight, at least about 0.1%, preferably from about 0.2% to about 20%, more preferably from about 0.3% to about 10%, and even more preferably from about 1% to about 5% lubricant system. The lubricant system includes at least a first surface modifier and a second surface modifier. The first surface modifier is present in the coating composition in an amount, by weight, of at least about 0.1%, preferably from about 0.25% to about 16%, more preferably from about 0.3% to about 12%, and even more preferably from about 0.5% to about 8%. The second surface modifier is present in the coating composition in an amount that is, by weight, of at least about 0.1%, preferably from about 0.25% to about 16%, more preferably from about 0.3% to about 12%, and even more preferably from about 0.5% to about 8%. The lubricant system can be present in a dispersion having an average particle size distribution that ranges from about 0.5 to about 5 microns.

Optionally, a cross-linker is included for curing the epoxy-based resin. The type and amount of cross linker can depend upon the type and amount of epoxy-based resin that is present in the coating composition. The coating composition comprises, by weight, based upon the total solids in the coating composition, preferably from about 0% to about 50%, more preferably from about 0.1% to about 40%, and even more preferably from about 2% to about 10%, and most preferably from about 2% to about 8% cross-linker.

The coating composition of the present invention which includes a film-forming component of an epoxy-based resin and a lubricant system having a first surface modifier that reduces the coefficient of friction and a second surface modifier that increases the resistance to abrasion, when cured and dried, yields improved release properties. It has been further found that improved release properties are achieved when the dried and cured coating of the present invention has a coefficient of friction (COF) that is less than 0.15, preferably less than about 0.1, more preferably less than about 0.07, and even more preferably less than about 0.05, and abrasion that is very slight or substantially zero as measured by the Olsen Abrasion tests. The results of these tests are listed in Table II and correspond to Examples 5-8 below.

The cured coating composition of the present invention demonstrates excellent adhesion to the metal substrate, excellent chemical resistance and scratch resistance, and excellent flexibility. The coating composition also effectively inhibits the corrosion of metal substrate, such as, but not limited to, aluminum, iron, steel and copper. Details regarding the above constituents of the coating composition of the present invention are discussed in more detail below.

Epoxy-Based Resin

The coating composition of the present invention includes a film-forming component that is an epoxy-based resin. Suitable epoxy-based resins and methods of making them are well known by those skilled in the art. Epoxy-based resins can be made in the form of dispersions in organic solvents and co-solvents, including water.

In one embodiment of the invention the epoxy-based resin is an epoxy-acrylic resin. The epoxy-acrylic resins and method for making them are varied and well known by those skilled in the art. Suitable epoxy-acrylic resins in aqueous dispersions are described in U.S. Pat. No. 6,306,934 B1 to Bode et al. and is hereby incorporated by reference herein. Additional suitable epoxy-acrylic resins include, but are not limited to, those described in U.S. Pat. No. 6,008,273 to Leibelt et al. and U.S. Pat. No. 5,830,952 to Pedersen et al.

Other suitable epoxy-based resins include, but are not limited to, epoxy-acrylic resins, epoxy-polyester resins and epoxy-phosphate resins. Suitable epoxy resin-based polymers for use in the present composition are disclosed, for example, in U.S. Pat. No. 5,567,781 to Martino et al. which discloses a polyester modified solvent based end coating; U.S. Pat. No. 5,635,049 to Mysliwczyk et al. which discloses water based electrocoats for ends based on epoxy phosphate; U.S. Pat. No. 5,527,840 to Chutko et al. which discloses epoxy-acrylic resin grafted by amine catalyzed esterification and cured with t-butyl phenolic resin; U.S. Pat. No. 5,296,525 to Spencer which discloses grafting the aqueous polymer by pre-reacting methacrylic acid to some of the epoxy groups before emulsification; U.S. Pat. No. 4,480,058 to Ting et al. which discloses amine catalyzed epoxy-acrylic esterification; U.S. Pat. No. 4,476,262 to Chu et al which discloses aqueous polymerization in presence of epoxy-acrylic; U.S. Pat. No. 4,446,258 to Chu et al. which discloses additional stage polymerization in presence of epoxy-acrylic in solution; U.S. Pat. No. 4,302,373 to Steinmetz which discloses esterifcation with tertiary amine catalyst of epoxy-acrylic by blocking some of the epoxy groups;

U.S. Pat. No. 4,247,439 to Matthews et al. which discloses quaternary amine salt plus ester graft; and EP Patent No. 0 006 334 B1 to Brown et al. which discloses amine catalyzed esterification. This above list of epoxy-based resins and dispersions thereof is not exhaustive.

Lubricant System

It has been found that the lubricant system of the present invention, which includes a first surface modifier and a second surface modifier provide improved release properties, as measured by the coefficient of friction and abrasion resistance, when present in a coating composition containing epoxy-based resin.

As mentioned above, whereas conventional coating compositions which include epoxy-based resins without a lubricant system will have a COF of 0.25 or greater, it has been found that coating composition of the present invention, containing an epoxy-based resin and the lubricant system described herein results in a coating with improved release properties. The dried and cured coating of the present invention has a coefficient of friction (COF) that is less than about 0.15, preferably, less than about 0.1, more preferably, less than about 0.07, and even more preferably, less than about 0.05. Also the abrasion of the cured coating is very slight or substantially zero as measured by the Olsen Abrasion test.

The first surface modifier which reduces the COF can include, but is not limited to the following materials: carnauba wax; petroleum waxes including paraffin wax, microcrystalline waxes, semicrystalline waxes; silicones; insect and animal waxes including, beeswax, candelilla, japan wax, ouricury wax, Douglas-fir bark wax, rice-bran wax, jojoba, castor wax, and bayberry wax; hydrogenated castor oil; high molecular weight acids and alcohols; mineral waxes including monton wax, peat wax, ozokerite, ceresin; and mixtures of the above.

The second surface modifier which increases the abrasion resistance of the coating composition can include, but is not limited to the following materials: polyolefins and polyolefin copolymers including, polypropylene, modified polypropylenes, polyethylene and modified polyethylenes; polytetrafluoroethylene; Fischer-Tropsch waxes, and mixtures of the above. The first surface modifier is different than the second surface modifier, and preferably, the second surface modifying has a higher molecular weight than the first surface modifier.

Surprisingly, the presence of the second surface modifier appears to enhance the effectiveness of the first surface modifier. Although not wishing to be bound by any particular theory, the second surface modifier which is not very soluble in the epoxy-based resin tends to rise to the surface of the coating away from the substrate upon exposure to heat when the coating composition is dried and cured. In addition, the first surface modifier which may have a higher degree of solubility in the epoxy-based resin may be soluble in the second surface modifier, and therefore, also tends to rise to the surface of the coating upon exposure to heat. Therefore, it is believed that the combination of the first surface modifier and the second surface modifier are effective in producing a coating surface that has a lower coefficient of friction, improved abrasion resistance and better release properties, upon curing, as compared to a coating composition that does not include both the first surface modifier and the second surface modifier.

The first surface modifier and the second surface modifier, preferably in the form of solid particles, are dispersed in organic solvent or water or a mixture of both. The first surface modifier and the second surface modifier can be mixed into the epoxy-base resin dispersion, preferably, such that the particles are homogeneously dispersed in the liquid coating.

The lubricant system of the present invention optionally includes from about 0.5% to about 30% by weight, based on the total solids in the coating composition, surfactant or dispersing polymer or mixtures thereof. Surfactants and dispersing polymers are well known in the art and include, but are not limited to, anionic and nonionic surfactants. Various dispersing polymers may include the epoxy-based resins and cross-linker used in the present invention.

In another embodiment of the present invention, the coating composition includes an epoxy-based resin and a lubricant system that includes a first surface modifier that is carnauba wax and a second surface modifier that includes polyethylene.

In another embodiment of the present invention, the coating composition includes an epoxy-acrylic resin and a lubricant system that includes a first surface modifier that is carnauba wax and a second surface modifier that includes polyethylene. The polyethylene typically has a molecular weight that is less than about 20,000.

Cross-Linker

Cross linkers that can optionally be used in the coating composition of the present invention to achieve the required physical properties of the cured coating on the substrate. A suitable cross-linker can include, but is not limited to, melamine-formaldehyde, urea-formaldehyde, phenol-formaldehyde, benzoguanamine-formaldehyde resins, and the like, optionally partially or fully etherified with alcohols are well known in the art. They may be used individually or blended together. Others may be possible as well, and this list is not meant to be exhaustive. The cross linkers may also be used to disperse the lubricant components.

In one embodiment the coating composition includes an epoxy-acrylic resin and uses a phenol-formaldehyde resin made from Bisphenol A and an alkyl phenol in conjunction with a melamine-formaldehyde resin.

Solvent

Solvents such as xylene, benzene, ethyl benzene, toluene, and the alkoxy alkanols are satisfactory. Alcohols such as methanol, ethanol, propanol, butanol, and the like, are suitable, with alkyl ethers of ethylene or propylene glycol being preferred for solvent systems that contain water. The ethylene glycol monobutyl ether, ethylene glycol ethyl ether, diethylene glycol monobutyl ether, and the like are preferred. For subsequent dispersion into water, the solvents selected should be water-soluble materials, such as butanol, propanol, ethylene glycol monoethyl ether, and the like, although small amounts of mineral spirits, hexane, and similar aliphatics may be used.

The method of coating a metal substrate according to another aspect of the present invention includes: applying the liquid coating composition of the present invention to a metal substrate and drying the coating. The coating can be applied to the substrate by a roller which wipes the coating onto the surface of the metal. A second roll can also apply a coating to the opposite side of the substrate. For a beverage can lid, for example, the inside surface which contacts the beverage, is applied such that the it is coated with about 8 milligrams per square inch of metal of dried coating, and the outside surface receives about 2 mg per square inch of dried coating. The coated metal strip enters an oven within a second or two, and travels through the oven with a residence time that varies with the speed of the line, typically from about 8 to about 25 seconds. It metal reaches a peak metal temperature of about 230° C. to about 250° C. and the volatile components of the coating are evaporated. The coating chemically cures, and is aided by reaction of the cross-linker, if present, to become solid.

The present invention may be further described by reference to the following examples.

WORKING EXAMPLES

Sample Preparation

The coating compositions of Examples 1-4 were prepared by mixing the aqueous epoxy-acrylic emulsion with the phenol-formaldehyde crosslinking resins and a predispersion of waxes. The weight of each component based on the total weight of the coating composition is listed in Table I. Additional water or co-solvent may be added to reduce viscosity and nonvolatile content. Colorants or predispersed pigments can be mixed into the system if decorative properties are desired.

TABLE I

| Wt. % | Ex. 1 | Ex. 2 | Ex. 3 | Ex. 4 |
|---|---|---|---|---|
| Epoxy-acrylic | 287.9 | 287.9 | 287.9 | 287.9 |
| Phenol-formaldehyde | 7.1 | 7.1 | 7.1 | 7.1 |
| Carnauba wax | 12.0 | — | 8.0 | — |
| Polyethylene wax | — | 3.0 | 3.0 | — |
| Carnauba/polyethylene blend | — | — | — | 13.6 |

(1) Aqueous modified epoxy acrylic per U.S. Pat. No. 6,306,934 at 33% NV
(2) Phenol-formaldehyde crosslinker supplied by DSM Resins, HRJ 12632
(3) Carnauba wax emulsion supplied by Michelman Chemicals, Michem-lube 160
(4) Polyethylene wax supplied by Micro Powders, Mpp-620F
(5) Carnauba/Polyethylene blend dispersion supplied by Lubrizol, Lanco Glidd TPG-102

TABLE II

| Test Method | Ex. 5 | Ex. 6 | Ex. 7 | Ex. 8 |
|---|---|---|---|---|
| Altek Lubricity (COF) | .07-.09 | .1-.12 | .05-.07 | .05-.07 |
| Olsen Abrasion (Pick-Off) | Severe | None | None | None |
| Olsen Abrasion (2000 lbs.) | Heavy | Slight | Very slight | Very slight |

In Examples 9-15 below, several coatings were tested in the making of easy open ends of aluminum cans. The coating compositions of Example 4 above was used in Examples 9 and 10 and conventional or proprietary coating compositions were used in Comparative Examples 11-15. The coatings were applied aluminum coil by a roller which wipes the coating onto one surface (the outside surface of the coil can lid) at a dried coating thickness that ranged from about 2-3 milligrams per square inch. The weight of coating in Example 9 was about 2 milligrams per square inch and the weight of the dried coating in Example 10 was about 3 milligrams per square inch. All samples except one of the comparative examples had the same coating applied to both sides of the coil, with the outside of the coil having a dried thickness of about 7-8 milligrams per square inch.

The coated metal cold rolled out as a strip was immediately (within 1-2 seconds) run through an oven in a residence time of about 11 seconds. The temperature of the oven ranged from about 225° C. to about 240° C.

The coated coil containing each coating composition was cut into strips and the strips were fabricated on the Redicon End Level II pilot press. The coated and stamped shells for the easy open cans were inspected at 10,000 stroke intervals and were inspected until the scuffing was determined to be unacceptable. The shells were given a scuffing index rating that ranged from 1-4 with 4 being the worst, based on visual inspection. The ratings given to shells with the various coating compositions according to the number of press strokes is listed in Table III.

TABLE III

| Press Strokes | Ex. 9 | Ex. 10 | Compar. Ex. 11 | Compar. Ex. 12 | Compar. Ex. 13 | Compar. Ex. 14 | Compar. Ex. 15 |
|---|---|---|---|---|---|---|---|
| 500 | 1 | 1 | 1 | 2 | 1 | 3.5 | 1 |
| 2500 | 1 | 1 | 1 | 2 | 2.5 | 4 | 1 |
| 5000 | 1 | 1 | 1 | 2 | 3 | | 1 |
| 10000 | 1 | 1 | 1.5 | 2 | 3 | | 2 |
| 20000 | 1 | 1 | 1.5 | 2 | 4 | | 2.5 |
| 30000 | 1 | 1 | 1.5 | 2 | | | 2.5 |
| 40000 | 1 | 1 | 1.5 | 2.5 | | | 3 |
| 50000 | 1 | 1 | 2 | 2.5 | | | 3 |
| 60000 | 1 | 1 | 2 | 2.5 | | | 3 |
| 70000 | 1 | 1 | 2 | 2.5 | | | 3.5 |
| 80000 | 1 | 1 | 2.5 | 3 | | | 4 |
| 90000 | 1 | 1 | 3 | 3 | | | 4 |
| 100000 | 1 | 1 | 3 | 3 | | | 4 |
| 110000 | 1 | 1 | | | | | 4 |
| 120000 | 1 | 1 | | | | | 4 |

In examples 5-8, laboratory test panels having an aluminum substrate were prepared by using wire round rods to make draw-downs of uniform coating weights of 1.0-8.0 milligrams per square inch (msi). These panels were baked to peak metal temperatures of 224-250° C. with oven dwell times of 10-20 seconds. The results of the coefficient of friction and a qualitative abrasion resistance test is listed below in Table II.

The results show that the coating of the present invention used in Examples 9 and 10 showed no visual scuffing as far as the trial was run to 275,000 press strokes.

The invention has been described with reference to various specific and preferred embodiments and techniques. It should be understood, however, that many variations and modifications may be made while remaining within the spirit and scope of the invention.

We claim:

1. An exterior beverage container can end coating composition which comprises:
   from about 10% to about 50% solids based on the weight of the coating composition, the solids comprising:
   a) an epoxy-based resin;
   b) from about 0.1% to about 20% by weight of a lubricant system which comprises:
      carnauba wax; and
      polyethylene; and
   c) a solvent selected from an organic material, water, or a mixture of an organic material and water,
   wherein the coefficient of friction (COF) of the coating composition when dried is 0.07 or less.

2. The coating composition of claim 1, wherein the coating composition comprises;
   from about 0.1% to about 16% by weight of the carnauba wax; and
   from about 0.1% to about 16% by weight of the polyethylene.

3. The coating composition of claim 1, further comprising, by weight, from about 0.1% to about 40% of a cross-linker.

4. The coating composition of claim 3, wherein the cross-linker is selected from the group of melamine-formaldehyde, urea-formaldehyde, phenol-formaldehyde, benzoguanamine-formaldehyde resins, or blends thereof, which are optionally partially or fully etherified with alcohols.

5. The coating composition of claim 1, further comprising, by weight, from about 2% to about 10% of a cross-linker.

6. The coating composition of claim 1, wherein the solvent of organic material is selected from xylene, benzene, ethyl benzene, toluene, alkoxy alkanols alcohols with or without alkyl ethers of ethylene or propylene glycol, ethylene glycol monobutyl ether, ethylene glycol ethyl ether, or diethylene glycol monobutyl ether arid the solvent is present in an amount of at least about 50% by weight, based on the liquid coating composition.

7. The coating composition of claim 1, wherein the water is present as a solvent in an amount from about 30% to about 45%.

8. The coating composition of claim 1, wherein the water is present as a solvent along with water-soluble materials selected from butanol, propanol, or ethylene glycol monoethyl ether.

9. The coating composition of claim 1 wherein the lubricant system is present in a dispersion having an average particle size distribution that ranges from about 0.5 to about 5 microns.

10. The coating composition of claim 1, wherein the lubricant system further comprises at least one of a surfactant and a dispersing polymer.

11. The coating composition of claim 10, wherein the surfactant or dispersing polymer or mixtures thereof are selected from anionic and nonionic surfactants and the epoxy-based resin used as a dispersing polymer.

12. The coating composition of claim 10, wherein the surfactant or dispersing polymer or mixtures thereof are present in an amount from about 0.5% to about 30% by weight, based on the total solids in the coating composition.

13. The coating composition of claim 1, wherein the epoxy-based resin is selected from epoxy-acrylic resins, epoxy-polyester resins, or epoxy-phosphate resins.

14. The coating composition of claim 13, wherein the epoxy acrylic resin is in an aqueous dispersion.

15. The coating composition of claim 1, further comprising, by weight up to about 50% of a cross-linker.

16. The coating composition of claim 15 wherein the cross-linker also functions as the dispersing polymer.

17. The coating composition of claim 1 without polyvinylchloride.

18. The coating composition of claim 1, wherein the polyethylene is a polyethylene wax.

19. The coating composition of claim 1, wherein the polyethylene is a polyethylene has a molecular weight of less than about 20,000.

20. The coating composition of claim 1, wherein the carnauba wax and the polyethylene are present as a carnauba wax and polyethylene blend dispersion.

21. The coating composition of claim 1, wherein the coefficient of friction of the coating when dried is in the range of from about 0.05 to 0.07.

22. A method for coating an exterior beverage container metal substrate, which comprises:
   applying a coating composition to the metal substrate;
   heating the metal substrate and coating composition until the coating composition is cured to produce a cured coating film having a film weight that ranges from about 1 mg/in$^2$ to about 8 mg/in$^2$;
   wherein the cured coating film comprises, by weight, based on the total solids in the coating composition, from about 50% to about 99.5% epoxy-based resin;
   from at least about 0.1% of carnauba wax; and
   from at least about 0.1% of polyethylene; and
   wherein the cured coating film has a coefficient of friction that is 0.07 or less.

23. A metal substrate with properties such as those of aluminum, iron, steel or copper having at least one surface with a cured film of a coating composition coated by the method of claim 22 as ends or shells for easy open cans.

24. An exterior beverage container can end coating composition, which comprises:
   from about 10% to about 50% solids based on the weight of the coating composition, the solids comprising:
   a) an epoxy-based resin;
   b) from about 0.1% to about 20% by weight of a lubricant system present as a dispersion having an average particle size distribution ranging from about 0.5 to about 5 microns , which comprises:
      carnauba wax; and
      a polyethylene surface modifier for abrasion resistance; and
   c) up to about 50% by weight of a cross-linker, and a solvent selected from an organic material, water, or a mixture of an organic material and water, wherein the coefficient of friction (COF) of the coating composition when dried is less than about 0.05.

* * * * *